Figure 1:
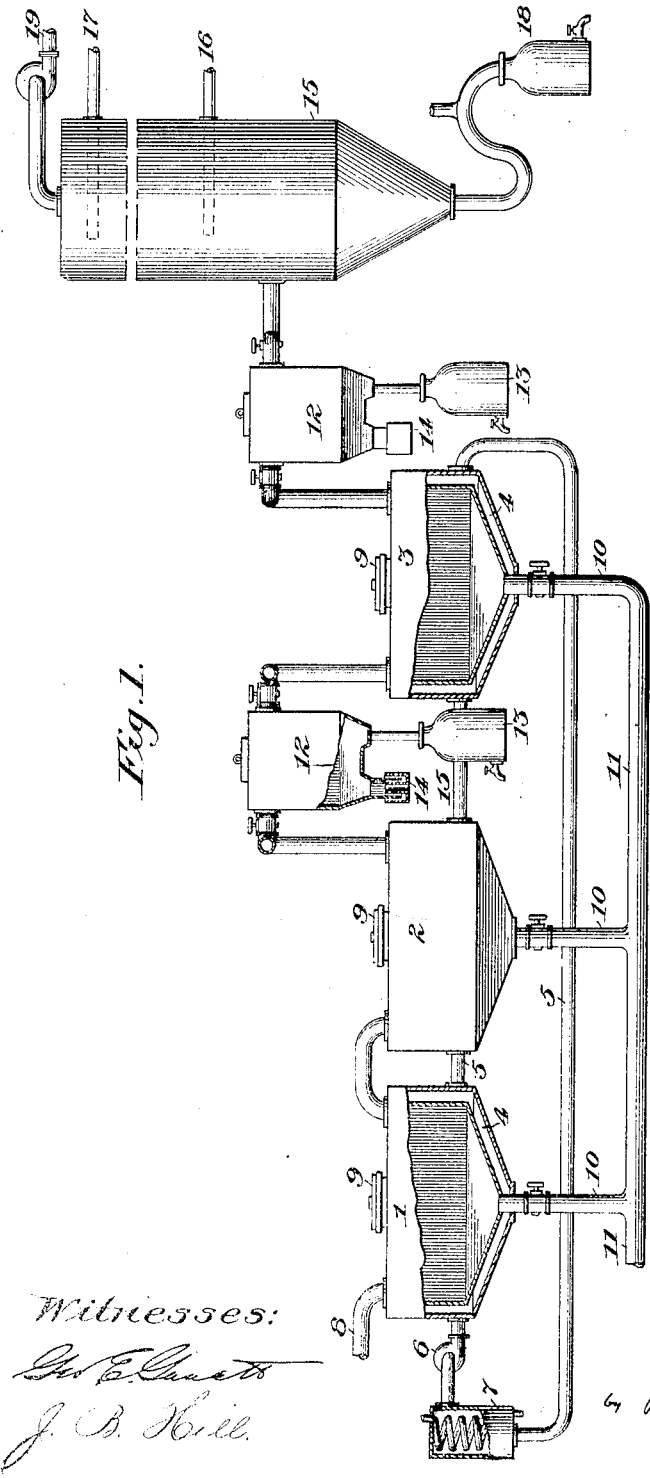

No. 882,354. PATENTED MAR. 17, 1908.
E. A. SPERRY.
METHOD OF MAKING STANNIC CHLORID.
APPLICATION FILED NOV. 23, 1905.

2 SHEETS—SHEET 1.

Witnesses:
Inventor:
Elmer A. Sperry,
by Byrnes & Townsend,
Attys.

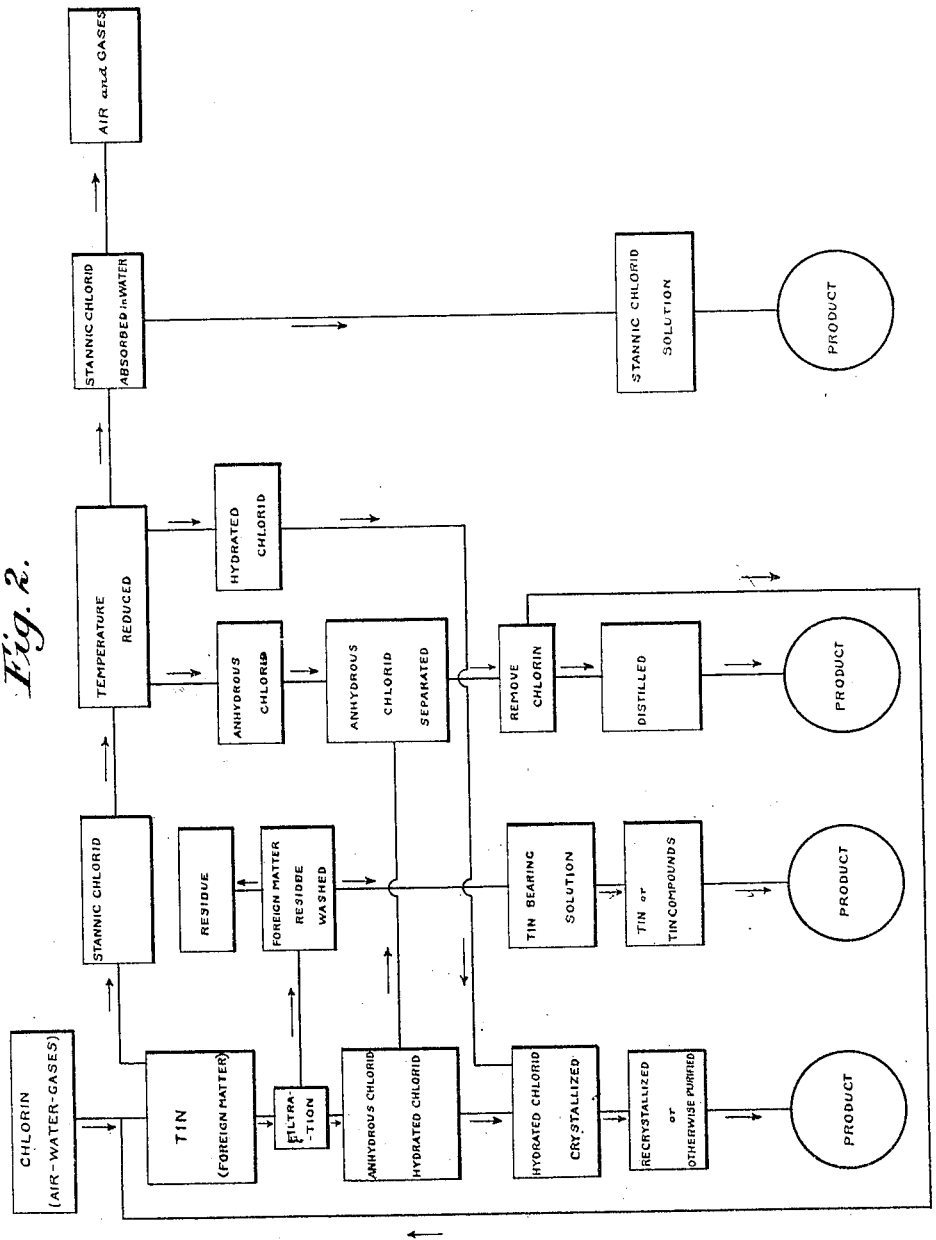

UNITED STATES PATENT OFFICE.

ELMER A. SPERRY, OF BROOKLYN, NEW YORK, ASSIGNOR TO CHEMICAL REDUCTION COMPANY, OF NEW YORK, N. Y., A CORPORATION OF NEW YORK.

METHOD OF MAKING STANNIC CHLORID.

No. 882,354.  Specification of Letters Patent.  Patented March 17, 1908.

Application filed November 23, 1905. Serial No. 288,780.

*To all whom it may concern:*

Be it known that I, ELMER A. SPERRY, a citizen of the United States, residing at Brooklyn, in the county of Kings and State of New York, have invented certain new and useful Improvements in Methods of Making Stannic Chlorid, of which the following is a specification.

This invention is a method of treating metallic tin or bodies containing the same to produce compounds of tin and particularly the anhydrous and hydrated stannic chlorids. According to my invention a material consisting wholly or in part of metallic tin, hereinafter referred to as a tin-bearing material, is subjected to the action of chlorin in any of its reacting conditions, that is to say as gaseous chlorin, mixed or not with air, water or water vapor or other gases; dissolved chlorin, as, for instance, a solution of chlorin in anhydrous or hydrated stannic chlorid; or liquid chlorin. The method of treatment is the same in essential particulars in all cases, in that the chlorin is brought into reacting relation with metallic tin under conditions which admit of temperature control. The reaction is carried out in inclosed vessels which may be placed in series or in multiple relation.

As a specific example of my method I will describe the production of chlorids of tin by reacting on a tin-bearing material with chlorin dissolved in chlorid of tin, it being understood that the invention is not limited to this particular procedure.

For a full understanding of my invention reference is made to the accompanying drawings wherein—

Figure 1 shows in side elevation an arrangement of apparatus for carrying out my invention, parts being broken away; and Fig. 2 is a diagram illustrative of my method.

Referring to Fig. 1: 1, 2, 3 are reaction vessels which are shown as connected in series but which may be used singly. These vessels may be of iron, lead or other suitable material, and are jacketed as indicated at 4, means comprising a pipe-system 5 and a pump 6 being provided for circulating a heating or cooling medium, as water, through the jackets of the several vessels, thereby effecting a transfer of heat between the several reacting bodies; this is of advantage since the heat from the bodies at higher temperature is transferred in part to those of lower temperature, thereby equalizing the temperatures throughout the system. This arrangement is employed when a number of vessels are used whether the vessels are connected in series or in multiple.

7 is a device for heating or cooling the circulating medium as may be required, the temperature of the circulating medium being so regulated as to withdraw heat during the reaction period and to supply heat during the subsequent distillation of stannic chlorid.

8 is an inlet for chlorin, with which air and other gases and water or water-vapor are commonly associated. Tin in bar, powder or other form is introduced from time to time through suitable covered apertures 9, and during the major portion of the reaction period a considerable excess of the metal should be present. The products of the reaction remaining from the distillation are withdrawn as required through valved pipes 10 which may conveniently communicate with the common discharge pipe 11.

When moisture is present in the chlorin or is admitted therewith the product will consist of anhydrous and hydrated chlorids of tin, the proportion of these chlorids being governed by the proportion of moisture in the chlorin. I have found that a certain proportion of moisture is advantageous in practice, since the solution of tin is accelerated by its presence or by the presence of the hydrated chlorid resulting from its combination. The temperature of the reacting mass is preferably maintained at such degree as to avoid substantial separation of the hydrated stannic chlorid, this temperature varying somewhat in accordance with the character of the material under treatment and the proportion of hydrated chlorid present, and being controlled by the temperature of the circulating liquid. Under these temperature conditions the several chlorids are liquid and are readily withdrawn from the reaction vessels carrying with them any solid residues. Preferably these mixed liquid chlorids are filtered or strained from any foreign matter or undissolved residue while hot and are then permitted to cool, whereupon the hydrated chlorid crystallizes out as a marketable product, recrystallization or other method of purification being resorted to if necessary. The undissolved residue may then be leached with water or other solvent and the resulting dilute solution of tin treated as desired for the separation of the metal or its compounds.

The anhydrous chlorid, separated from the hydrated chlorid by decantation or otherwise, together with that recovered at other points as hereinafter described, contains dissolved or free chlorin, which is readily removed, preferably by elevation of temperature, and is returned to the system. The resulting anhydrous chlorid may be marketed or may be further purified by distillation.

When an excess of chlorin is used, or when the chlorin is diluted or admixed with air, carbon dioxid, moisture, etc., as is commonly the case, the residual gases passing from the reaction vessel are charged or saturated with chlorid of tin. These gases are preferably cooled, as in condensers 12, 12, conveniently arranged in communicating pairs as indicated, whereby a separation of both anhydrous and hydrated chlorid occurs. The anhydrous chlorid is collected as in vessels 13, and any chlorin separated as hereinbefore described; the hydrated chlorid is removed from the condensers through outlets 14 in the form of crystals and is added to that recovered from the reaction vessels.

The separation of chlorid of tin from the uncondensed gases in the condensers is ordinarily incomplete, and the final portions are preferably removed by leading the gases into contact with water or other solvent in a tower or scrubber 15. I have found it preferable in practice to subject these gases to the action of the solvent at successively higher and lower temperatures, as, for instance, by admitting hot water through the lower inlet or spray 16, and cold water through the upper inlet 17, whereby all traces of tin compounds are separated; obviously communicating scrubbers for hot and cold water or solvent, respectively, may be used, or equivalent means may be used to effect the same result. The product from the tower 15, collected as at 18, is a stannic chlorid solution the concentration of which will obviously depend upon the proportion of the water used to the stannic chlorid in the vapors. No difficulty is experienced in preparing the solution of 50—60° Bé., if desired, such solution being a marketable product.

The exhaust fan 19 for the residual gases serves to maintain a diminished pressure in the tower 15 as compared with the pressure in the reaction vessels, and thereby to insure a movement of the gases through the system.

Fig. 2 expresses in diagrammatic form the several reactions and separations which occur and the disposition of the products as herein set forth.

The expression "liquid hydrated stannic chlorid" occurring in the claims refers to a hydrated stannic chlorid liquefied by heat or existing above its temperature of solidification or separation, and does not include an aqueous solution of stannic chlorid.

I claim:—

1. The method of producing stannic chlorid which consists in bringing chlorin into contact with a body of tin-bearing material in the presence of anhydrous stannic chlorid, maintaining the stannic chlorid substantially saturated with free chlorin, cooling the reacting mass, and maintaining therein during reaction a temperature not exceeding the vaporizing point of anhydrous stannic chlorid.

2. The method of producing stannic chlorid which consists in reacting on a tin-bearing material with diluted chlorin in the presence of anhydrous stannic chlorid and cooling the reacting mass.

3. The method of producing stannic chlorid which consists in reacting on a tin-bearing material with chlorin containing moisture as a diluent in the presence of anhydrous stannic chlorid and cooling the reacting mass.

4. The method of producing stannic chlorid which consists in reacting on a tin-bearing material with chlorin containing moisture and air as diluents in the presence of anhydrous stannic chlorid and cooling the reacting mass.

5. The method of producing stannic chlorid which consists in reacting on a tin-bearing material with free chlorin in presence of liquid hydrated stannic chlorid.

6. The method of producing stannic chlorid which consists in reacting on a tin-bearing material with free chlorin in presence of liquid hydrated stannic chlorid and anhydrous stannic chlorid.

7. The method of producing stannic chlorid which consists in reacting on a tin-bearing material with chlorin in the presence of water in quantity insufficient to produce solution, forming thereby anhydrous and hydrated stannic chlorids, vaporizing such chlorids and condensing them.

8. The method of producing stannic chlorid which consists in reacting on a tin-bearing material with chlorin in the presence of water in quantity insufficient to produce solution, forming thereby anhydrous and hydrated stannic chlorids, vaporizing such chlorids and condensing them, and bringing the residual gases into contact with a solvent for stannic chlorid.

9. The method of producing stannic chlorid which consists in reacting on a tin-bearing material with chlorin in the presence of water in quantity insufficient to produce solution, forming thereby anhydrous and hydrated chlorids of tin, and controlling the temperature of the reaction.

10. The method of producing stannic chlorid which consists in reacting on a tin-bearing material with chlorin in presence of water in quantity insufficient to produce solution, and maintaining the temperature above the melting point of the hydrated stannic chlorid.

11. The method of producing stannic chlorid which consists in reacting on a tin-bearing material with chlorin in presence of water in quantity insufficient to produce solution, producing thereby anhydrous and hydrated stannic chlorids and separating said chlorids from each other.

12. The method of producing stannic chlorid which consists in reacting on a tin-bearing material with chlorin in presence of water in quantity insufficient to produce solution, producing thereby anhydrous and hydrated stannic chlorids, separating said chlorids from each other, and separating the chlorin from the anhydrous chlorid.

13. The method of producing stannic chlorid which consists in reacting on a tin-bearing material with chlorin in presence of water in quantity insufficient to produce solution, maintaining the temperature during reaction above the melting point of the hydrated chlorid, then cooling the mixture and separating the anhydrous and hydrated chlorids from each other.

14. The method of producing stannic chlorid which consists in bringing chlorin into contact with a tin-bearing material and producing anhydrous stannic chlorid, maintaining the stannic chlorid substantially saturated with free chlorin, condensing and collecting stannic chlorid, and bringing the residual gases into contact with a solvent for stannic chlorid.

15. The method of producing stannic chlorid which consists in reacting on a tin-bearing material with diluted chlorin, producing anhydrous stannic chlorid, condensing and collecting the same and bringing the residual gases into contact with a solvent therefor at successively higher and lower temperatures.

16. The method of producing stannic chlorid which consists in reacting on a tin-bearing material with chlorin condensing anhydrous stannic chlorid from the vapors and bringing the residual vapors into contact with a solvent therefor under pressure less than that of the atmosphere.

17. The method of making stannic chlorid which consists in reacting with chlorin on a tin-bearing material containing foreign matter, volatilizing part of said chlorid, and separating any remaining chlorid from the residue by the action of a solvent.

18. The method of producing stannic chlorid which consists in reacting with chlorin on separate bodies of tin-bearing material and effecting a transfer of heat between said bodies by means of a medium out of contact therewith.

19. The method of making stannic chlorid which consists in reacting with chlorin on a tin-bearing material in presence of a body of liquid anhydrous stannic chlorid cooling said body during the reaction period, vaporizing stannic chlorid from said body, and condensing same.

20. The method of making stannic chlorid which consists in reacting with chlorin on a tin-bearing material in presence of a body of liquid anhydrous stannic chlorid cooling said body during the reaction period, vaporizing stannic chlorid from said body while in the reaction vessel, and condensing same.

21. The method of making stannic chlorid which consists in reacting on a tin-bearing material with chlorin in presence of anhydrous stannic chlorid at a temperature below the vaporizing point of stannic chlorid, maintaining the reaction by supplying chlorin to the reacting mass, and separating the stannic chlorid from the undissolved residue by fractional distillation.

In testimony whereof, I affix my signature in presence of two witnesses.

ELMER A. SPERRY.

Witnesses:
 CLINTON P. TOWNSEND,
 C. W. FOWLER.